United States Patent
Kontomaris

(10) Patent No.: US 9,783,720 B2
(45) Date of Patent: Oct. 10, 2017

(54) USE OF REFRIGERANTS COMPRISING E-1,3,3,3-TETRAFLUOROPROPENE AND AT LEAST ONE TETRAFLUOROETHANE FOR COOLING

(75) Inventor: Konstantinos Kontomaris, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 868 days.

(21) Appl. No.: 13/884,293

(22) PCT Filed: Dec. 14, 2011

(86) PCT No.: PCT/US2011/064976
§ 371 (c)(1),
(2), (4) Date: May 9, 2013

(87) PCT Pub. No.: WO2012/082941
PCT Pub. Date: Jun. 21, 2012

(65) Prior Publication Data
US 2013/0219929 A1    Aug. 29, 2013

Related U.S. Application Data

(60) Provisional application No. 61/422,928, filed on Dec. 14, 2010.

(51) Int. Cl.
*F25B 45/00* (2006.01)
*C09K 5/00* (2006.01)
*C09K 5/04* (2006.01)

(52) U.S. Cl.
CPC ............... *C09K 5/00* (2013.01); *C09K 5/045* (2013.01); *C09K 2205/126* (2013.01); *C09K 2205/22* (2013.01)

(58) Field of Classification Search
CPC  C09K 2205/126; C09K 2205/32; C09K 5/00; C09K 5/045
(Continued)

(56) References Cited

U.S. PATENT DOCUMENTS 5,355,691 A * 10/1994 Sullivan .............. F04D 27/0261
  415/17
7,524,805 B2  4/2009 Singh et al.
(Continued)

FOREIGN PATENT DOCUMENTS

GB    1 578 933 A    11/1980
WO  2006/094303 A2   9/2006
(Continued)

OTHER PUBLICATIONS 1,1,2,2-Tetrafluoroethane (HFC 134). (n.d.). Retrieved Jan. 14, 2016, from http://www.caslab.com/1_1_2_2-Tetrafluoroethane-HFC-134-5.php5.*
(Continued)

*Primary Examiner* — Frantz Jules
*Assistant Examiner* — Steve Tanenbaum
(74) *Attorney, Agent, or Firm* — N. Lynn Tucker

(57) ABSTRACT

Disclosed herein is a method for producing cooling comprising evaporating a liquid refrigerant comprising (a) E-$CF_3CH$=CHF and (b) at least one tetrafluoroethane of the formula $C_2H_2F_4$; provided that the weight ratio of E-$CF_3CH$=CHF to the total amount of E-$CF_3CH$=CHF and $C_2H_2F_4$ is from about 0.05 to 0.99, in an evaporator, thereby producing a refrigerant vapor. Also disclosed herein is a method for replacing HCFC-124 or HFC-134a refrigerant in a chiller designed for said refrigerant comprising providing a replacement refrigerant composition comprising (a) E-$CF_3CH$=CHF and (b) at least one tetrafluoroethane of the formula $C_2H_2F_4$; provided that the weight ratio of
(Continued)

E-$CF_3CH$=$CHF$ to the total amount of E-$CF_3CH$=$CHF$ and $C_2H_2F_4$ is from about 0.05 to 0.99. Also disclosed herein is a chiller apparatus for cooling, said apparatus containing a working fluid comprising a refrigerant comprising (a) E-$CF_3CH$=$CHF$ and (b) at least one tetrafluoroethane of the formula $C_2H_2F_4$; provided that the weight ratio of E-$CF_3CH$=$CHF$ to the total amount of E-$CF_3CH$=$CHF$ and $C_2H_2F_4$ is from about 0.05 to 0.99.

11 Claims, 2 Drawing Sheets

(58) Field of Classification Search
USPC .............................................................. 62/77
See application file for complete search history.

(56) References Cited

U.S. PATENT DOCUMENTS

| | | |
|---|---|---|
| 7,825,081 B2 | 11/2010 | Singh et al. |
| 8,148,317 B2 | 4/2012 | Singh et al. |
| 2004/0256594 A1* | 12/2004 | Singh ............... A62D 1/0057 252/71 |
| 2006/0106263 A1 | 5/2006 | Miller et al. |
| 2008/0230738 A1 | 9/2008 | Minor et al. |
| 2012/0187331 A1 | 7/2012 | Singh et al. |

FOREIGN PATENT DOCUMENTS

| | | |
|---|---|---|
| WO | 2007/053697 A2 | 5/2007 |
| WO | 2009/018117 A1 | 2/2009 |
| WO | 2011/101620 A2 | 8/2011 |
| WO | 2011/101621 A2 | 8/2011 |
| WO | 2011/101622 A1 | 8/2011 |

OTHER PUBLICATIONS 1,1,1,2-Tetrafluoroethane (HFC 134a). (n.d.). Retrieved Jan. 14, 2016, from http://www.caslab.com/1_1_1_2-Tetrafluoroethane-HFC-134a-3.php5.*
Solstice™ ze (HFO-1234ze) Refrigerant. (n.d.). Retrieved Jan. 14, 2016, from http://www.honeywell-refrigerants.com/india/?document=solstice-ze-hfo-1234ze-brochure-2012&download=1.*
Trans-1,3,3,3-tetrafluoropropene. (n.d.). Retrieved Jan. 14, 2016, from http://www51.honeywell.com/sm/lgwp-fr/common/documents/FP_LGWP_FR_Honeywell-HFO-1234ze_Literature_document.pdf.*
The Scientific Assessment of Ozone Depletion, 2002, A report of the World Meteorological Association's Global Ozone Research and Monitoring Project, section 1.4.4, pp. 1.28 to 1.31.
M. F. Doherty and M.F. Malone, Conceptual Design of Distillation Systems, McGraw-Hill (New York), 2001, pp. 185-186, 351-359.
PCT International Search Report and Written Opinion mailed Apr. 12, 2012.

* cited by examiner

USE OF REFRIGERANTS COMPRISING E-1,3,3,3-TETRAFLUOROPROPENE AND AT LEAST ONE TETRAFLUOROETHANE FOR COOLING

This application represents a national filing under 35 U.S.C. 371 of International Application No. PCT/US11/64976 filed Dec. 14, 2011, and claims priority of U.S. Provisional Application No. 61/422,928 filed Dec. 14, 2010.

FIELD OF THE INVENTION

The present disclosure relates to use of refrigerant compositions comprising E-1,3,3,3-tetrafluoroethane and at least one tetrafluoroethane in chillers.

BACKGROUND OF THE INVENTION

The refrigeration industry has been working for the past few decades to find replacement refrigerants for the ozone depleting chlorofluorocarbons (CFCs) and hydrochlorofluorocarbons (HCFCs) being phased out as a result of the Montreal Protocol. The solution for most refrigerant producers has been the commercialization of hydrofluorocarbon (HFC) refrigerants. The HFC refrigerants, including HFC-134a, have zero ozone depletion potential and thus are not affected by the current regulatory phase out as a result of the Montreal Protocol.

Further environmental regulations may ultimately cause global phase out of certain HFC refrigerants. Currently, the automobile industry is facing regulations relating to global warming potential for refrigerants used in mobile air-conditioning. Therefore, there is a great current need to identify new refrigerants with reduced global warming potential for the mobile air-conditioning market. Should the regulations be more broadly applied in the future, for instance for stationary air conditioning and refrigeration systems, an even greater need will be felt for refrigerants that can be used in all areas of the refrigeration and air-conditioning industry.

HFC-134a and HCFC-124 are used in chillers to provide comfort air conditioning and cooling for industrial processes, among other uses. Replacements with reduced environmental impact are sought for these refrigerants. In particular, replacements are sought with low to no ozone depletion potential and low GWP.

SUMMARY OF THE INVENTION

The invention includes a method for producing cooling. The method comprises evaporating a liquid refrigerant comprising (a) E-CF$_3$CH=CHF and (b) at least one tetrafluoroethane of the formula C$_2$H$_2$F$_4$; provided that the weight ratio of E-CF$_3$CH=CHF to the total amount of E-CF$_3$CH=CHF and C$_2$H$_2$F$_4$ is from about 0.05 to 0.99 (e.g., 0.05 to 0.82, 0.1 to 0.8, and 0.85 to 0.99) in an evaporator, thereby producing a refrigerant vapor.

The invention also includes a method for replacing HCFC-124 or HFC-134a refrigerant in a chiller designed for said refrigerant. The method comprises providing a replacement refrigerant composition comprising (a) E-CF$_3$CH=CHF and (b) at least one tetrafluoroethane of the formula C$_2$H$_2$F$_4$; provided that the weight ratio of E-CF$_3$CH=CHF to the total amount of E-CF$_3$CH=CHF and C$_2$H$_2$F$_4$ is from about 0.05 to 0.99 (e.g., e.g., 0.05 to 0.82, 0.1 to 0.8, and 0.85 to 0.99) in an evaporator, thereby producing a refrigerant vapor.

The invention also includes a chiller apparatus for cooling. The chiller apparatus contains a working fluid comprising a refrigerant comprising (a) E-CF$_3$CH=CHF and (b) at least one tetrafluoroethane of the formula C$_2$H$_2$F$_4$; provided that the weight ratio of E-CF$_3$CH=CHF to the total amount of E-CF$_3$CH=CHF and C$_2$H$_2$F$_4$ is from about 0.05 to 0.99 (e.g., e.g., 0.05 to 0.82, 0.1 to 0.8, and 0.85 to 0.99).

DETAILED DESCRIPTION

Figure 1:
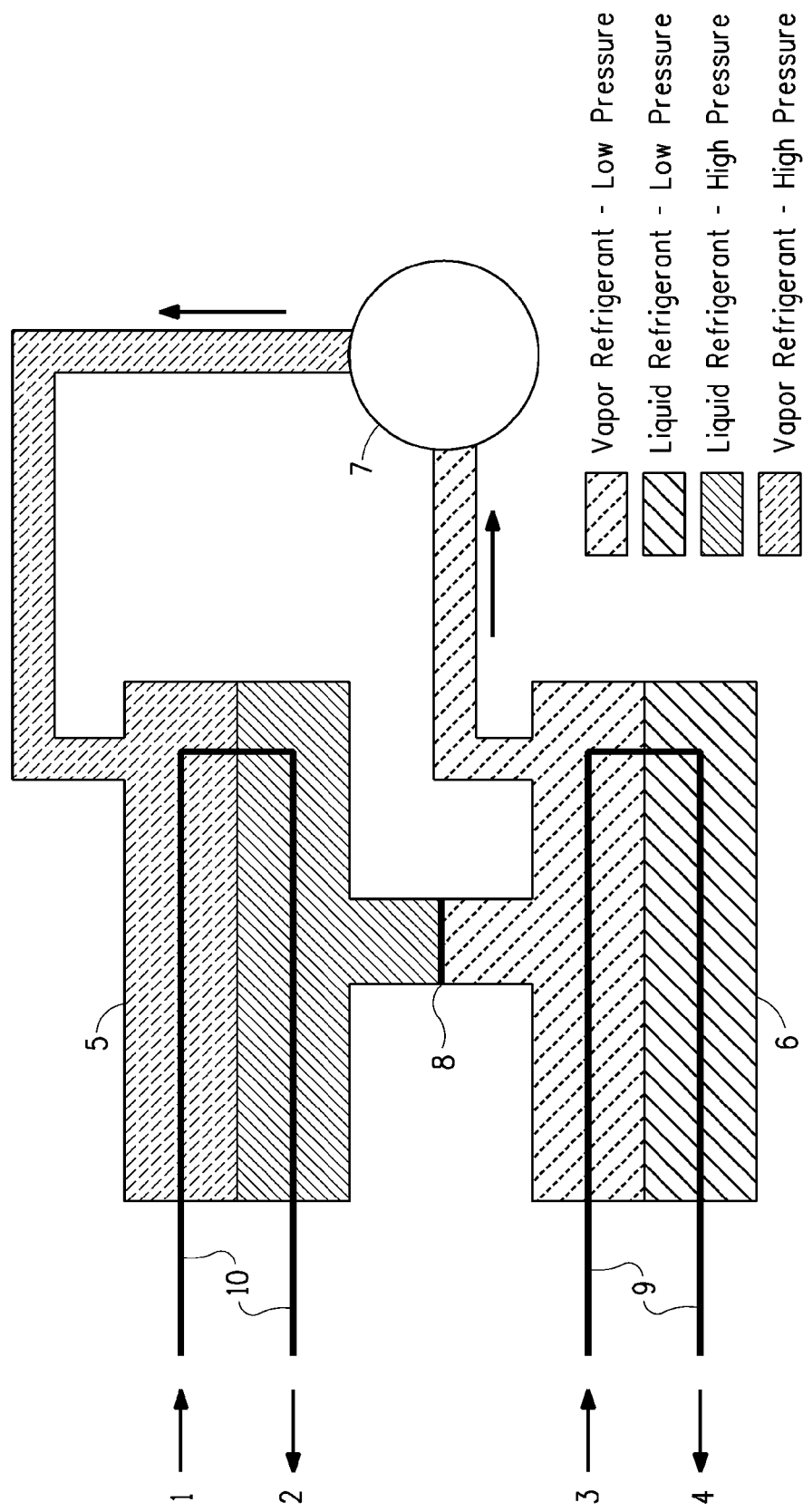
FIG. 1 is a schematic diagram of one embodiment of a flooded evaporator chiller apparatus which utilizes a composition containing E-CF$_3$CH=CHF and (b) at least one compound of the formula C$_2$H$_2$F$_4$.

Before addressing details of embodiments described below, some terms are defined or clarified.

Global warming potential (GWP) is an index for estimating relative global warming contribution due to atmospheric emission of a kilogram of a particular greenhouse gas (such as a refrigerant or working fluid) compared to emission of a kilogram of carbon dioxide. GWP can be calculated for different time horizons showing the effect of atmospheric lifetime for a given gas. The GWP for the 100 year time horizon is commonly the value referenced. Any values for GWP reported herein are based on the 100 year time horizon.

Ozone depletion potential (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound (such as a refrigerant or working fluid) on a mass-for-mass basis relative to fluorotrichloromethane (CFC-11).

Refrigeration capacity (sometimes referred to as cooling capacity) is a term to define the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or working fluid composition to produce cooling. Therefore, the higher the volumetric capacity, the greater the cooling that is produced. Cooling rate refers to the heat removed by the refrigerant in the evaporator per unit time. Heating capacity is the corresponding value for a heating system, such as a heat pump.

Coefficient of performance (COP) is the amount of heat removed in a cycle divided by the required energy input to operate the cycle. The higher the COP, the higher the energy efficiency. COP is directly related to the energy efficiency ratio (EER), that is, the efficiency rating for refrigeration, air conditioning, or heat pump equipment at a specific set of internal and external temperatures.

Temperature glide (sometimes referred to simply as "glide") is the absolute value of the difference between the starting and ending temperatures of a phase-change process by a refrigerant or working fluid within an equipment component of a cooling or heating cycle system, exclusive of any subcooling or superheating. This term may be used to describe condensation or evaporation of a near azeotrope or non-azeotropic composition. When referring to the temperature glide of a refrigeration, air conditioning or heat pump system, it is common to provide the average temperature glide being the average of the temperature glide in the evaporator and the temperature glide in the condenser. Moderate temperature glide is considered to be temperature glide less than 0.1 and is acceptable in flooded evaporator chillers as described herein.

As used herein, a refrigerant is a composition comprising a compound or mixture of compounds that function as a working fluid in a cycle wherein the composition undergoes a phase change from a liquid to a vapor and back in a repeating cycle. The repeating cycle may take place in any refrigeration system, refrigerator, freezer, air conditioning system, air conditioner, heat pump, chiller, and the like.

Cooling medium is used herein to describe a heat transfer fluid, or substance which is used in a secondary loop to transport cooling or heating from a chiller apparatus to a remote location or body to be cooled. Representative fluids that can serve as cooling media include water, glycols, such as ethylene glycol and propylene glycol, and ionic liquids, among others.

Flammability is a term used to mean the ability of a composition to ignite and/or propagate a flame. For refrigerants or other working fluids, the lower flammability limit ("LFL") is the minimum concentration of the refrigerant or working fluid in air that is capable of propagating a flame through a homogeneous mixture of the refrigerant or working fluid and air under test conditions specified in ASTM (American Society of Testing and Materials) E681-2001. The upper flammability limit ("UFL") is the maximum concentration of the refrigerant or working fluid in air that is capable of propagating a flame through a homogeneous mixture of the composition and air as determined by ASTM E-681. As the content of the non-flammable component in a mixture comprising a flammable and a non-flammable component increases, the LFL and the UFL approach each other. When the content of the non-flammable component in the mixture reaches a critical value, the LFL and UFL of the mixture become equal. Compositions containing more of the non-flammable component than this critical value are non-flammable. For a single component refrigerant or an azeotropic refrigerant blend, the composition will not change during a leak and therefore composition change during leaks will not be a factor in determining flammability. For many refrigeration, air conditioning, or heat pump applications, the refrigerant or working fluid is desired (if not required) to be non-flammable.

An azeotropic composition is a mixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (See, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is recognized that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

As used herein, an azeotrope-like (also referred to as near azeotropic) composition means a composition that behaves essentially like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit virtually equal dew point pressure and bubble point. That is to say that the difference in the dew point pressure and bubble point pressure at a given temperature will be a small value, such as 3% or 5% difference or less.

A non-azeotropic composition or a non-azeotrope-like composition is a mixture of two or more substances that behaves as a mixture rather than a single substance. One way to characterize a non-azeotropic composition is that the vapor produced by partial evaporation or distillation of the liquid has a substantially different composition from the liquid from which it was evaporated or distilled, that is, the mixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if the difference in dew point pressure and bubble point pressure is greater than or equal to 5 percent (based upon the bubble point pressure).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Compositions

Compositions as disclosed for use in the present methods include refrigerants comprising (a) E-CF$_3$CH=CHF (E-HFO-1234ze or trans-HFO-1234ze) and (b) at least one compound of the formula CF$_2$XCHFY wherein X and Y are each selected from the group consisting of H and F; provided that when X is H, Y is F and when X is F, Y is H. These compositions include as component (b) one or both of the two tetrafluoroethane isomers of formula C$_2$H$_2$F$_4$ (i.e., 1,1,2,2-tetrafluoroethane (HFC-134, CHF$_2$CHF$_2$) and/or 1,1,1,2-tetrafluoroethane (HFC-134a, CF$_3$CH$_2$F)).

E-CF$_3$CH=CHF is available commercially from fluorocarbon manufacturers or may be made by methods known in the art. In particular, this compound may be prepared by dehydrofluorination of a group of pentafluoropropanes, including 1,1,1,2,3-pentafluoropropane (HFC-245eb, CF$_3$CHFCH$_2$F), 1,1,1,3,3-pentafluoropropane (HFC-245fa, CF$_3$CH$_2$CHF$_2$). The dehydrofluorination reaction may take place in the vapor phase in the presence or absence of catalyst, and also in the liquid phase by reaction with caustic, such as NaOH or KOH. These reactions are described in more detail in U.S. Patent Publication No. 2006/0106263, incorporated herein by reference.

Compounds of formula C$_2$H$_2$F$_4$ may be available commercially or may be prepared by methods known in the art, for example by the method described in United Kingdom Pat. No. 1578933 (incorporated herein by reference) by the hydrogenation of tetrafluoroethylene. The latter reaction may be conveniently effected at normal or elevated temperatures, for example up to 250° C., in the presence of a hydrogenation catalyst, for instance, palladium on alumina. Additionally, HFC-134 may be made by the hydrogenation of 1,2-dichloro-1,1,2,2-tetrafluoroethane (i.e., CClF$_2$CClF$_2$ or CFC-114) to 1,1,2,2-tetrafluoroethane as reported by J. L. Bitner et al. in U.S. Dep. Comm. Off. Tech. Serv/Rep. 136732, (1958), pp. 25-27, incorporated herein by reference. HFC-134a may be made by the hydrogenation of 1,1-dichloro-1,2,2,2-tetrafluoroethane (i.e., CCl$_2$FCF$_3$ or CFC-114a) to 1,1,1,2-tetrafluoroethane.

In one embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.99 (e.g., from about 0.05 to about 0.82). Compositions comprising E-CF$_3$CH=CHF and CHF$_2$CHF$_2$ are considered to have moderate evaporator and condenser glide, or less than 0.1° C. temperature glide, when the weight ratio of E-CF$_3$CH=CHF to the total amount of E-CF$_3$CH=CHF and CHF$_2$CHF$_2$ is from about 0.01 to 0.68 (e.g., from about 0.05 to about 0.68). These compositions are considered to have low temperature evaporator and condenser glide, or less than 0.05° C. temperature glide when the weight ratio of E-CF$_3$CH=CHF to the total amount of E-CF$_3$CH=CHF and CHF$_2$CHF$_2$ is from about 0.01 to 0.55 (e.g., from about 0.05 to about 0.55). Of note are compositions with the weight ratio of E-CF$_3$CH=CHF to the total amount of E-CF$_3$CH=CHF and CHF$_2$CHF$_2$ is from about 0.30 to 0.43, which are considered to have negligible temperature evaporator and condenser glide, or less than 0.01° C. temperature glide.

In one embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.69 (e.g., from about 0.05 to about 0.69). The compositions comprising E-CF$_3$CH=CHF and CHF$_2$CHF$_2$ are considered to be non-flammable when the weight ratio of E-CF$_3$CH=CHF to the total amount of E-CF$_3$CH=CHF and CHF$_2$CHF$_2$ is from about 0.01 to 0.69. The compositions comprising E-CF$_3$CH=CHF and CHF$_2$CHF$_2$ are considered to be non-flammable when the weight ratio of E-CF$_3$CH=CHF to the total amount of E-CF$_3$CH=CHF and CHF$_2$CHF$_2$ is from about 0.01 to 0.699 (e.g., from about 0.05 to about 0.699). Of note are compositions comprising E-CF$_3$CH=CHF and CHF$_2$CHF$_2$ wherein the weight ratio of E-CF$_3$CH=CHF to the total amount of E-CF$_3$CH=CHF and CHF$_2$CHF$_2$ is less than 0.70.

In one embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.70. The compositions comprising E-CF$_3$CH=CHF and CHF$_2$CHF$_2$ are considered to provide volumetric cooling capacity and COP within 4% of the maximum attainable performance when the weight ratio of E-CF$_3$CH=CHF to the total amount of E-CF$_3$CH=CHF and CHF$_2$CHF$_2$ is from about 0.01 to 0.70 (e.g., from about 0.05 to about 0.44). The compositions comprising E-CF$_3$CH=CHF and CHF$_2$CHF$_2$ are considered to provide volumetric cooling capacity and COP within 3% of the maximum attainable performance when the weight ratio of E-CF$_3$CH=CHF to the total amount of E-CF$_3$CH=CHF and CHF$_2$CHF$_2$ is from about 0.01 to 0.65 (e.g., from about 0.05 to about 0.65). The compositions comprising E-CF$_3$CH=CHF and CHF$_2$CHF$_2$ are considered to provide volumetric cooling capacity and COP within 2% of the maximum attainable performance when the weight ratio of E-CF$_3$CH=CHF to the total amount of E-CF$_3$CH=CHF and CHF$_2$CHF$_2$ is from about 0.01 to 0.55 (e.g., from about 0.05 to about 0.55 or from about 0.30 to about 0.43). The compositions comprising E-CF$_3$CH=CHF and CHF$_2$CHF$_2$ are considered to provide volumetric cooling capacity and COP within 1% of the maximum attainable performance when the weight ratio of E-CF$_3$CH=CHF to the total amount of E-CF$_3$CH=CHF and CHF$_2$CHF$_2$ is from about 0.01 to about 0.35.

In one embodiment, component (b) is CHF$_2$CHF$_2$ and the weight ratio of E-CF$_3$CH=CHF to the total amount of E-CF$_3$CH=CHF and CHF$_2$CHF$_2$ is from about 0.09 to 0.99. The compositions comprising E-CF$_3$CH=CHF and CHF$_2$CHF$_2$ are considered to have GWP less than 1000 when the weight ratio of E-CF$_3$CH=CHF to the total amount of E-CF$_3$CH=CHF and CHF$_2$CHF$_2$ is from about 0.09 to 0.99 (e.g., from about 0.10 to about 0.82). The compositions comprising E-CF$_3$CH=CHF and CHF$_2$CHF$_2$ are considered to have GWP less than 300 when the weight ratio of E-CF$_3$CH=CHF to the total amount of E-CF$_3$CH=CHF and CHF$_2$CHF$_2$ is from about 0.73 to 0.99 (e.g., from about 0.73 to 0.82).

In one embodiment, component (b) is CF$_3$CH$_2$F and the weight ratio of E-CF$_3$CH=CHF to the total amount of E-CF$_3$CH=CHF and CF$_3$CH$_2$F is from about 0.01 to 0.82 (e.g., from about 0.05 to about 0.82). Of note are compositions comprising E-CF$_3$CH=CHF and CF$_3$CH$_2$F that are considered to be non-flammable when the weight ratio of E-CF$_3$CH=CHF to the total amount of E-CF$_3$CH=CHF and CF$_3$CH$_2$F is from about 0.01 to 0.82 (e.g., from about 0.05 to about 0.82). Also of note are compositions comprising E-CF$_3$CH=CHF and CF$_3$CH$_2$F that are considered to be non-flammable when the weight ratio of E-CF$_3$CH=CHF to the total amount of E-CF$_3$CH=CHF and CF$_3$CH$_2$F is from about 0.01 to 0.81 (e.g., from about 0.05 to about 0.81). Also of note are compositions comprising E-CF$_3$CH=CHF and CF$_3$CH$_2$F$_2$ that are considered to be non-flammable when the weight ratio of E-CF$_3$CH=CHF to the total amount of E-CF$_3$CH=CHF and CF$_3$CH$_2$F is from about 0.01 to 0.80 (e.g., from about 0.05 to about 0.80).

Of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.1 to 0.2. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.2 to 0.3. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.3 to 0.4. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.4 to 0.5. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.5 to 0.6. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.6 to 0.7. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.7 to 0.8.

Of note are compositions wherein component (b) is CF$_3$CH$_2$F and the weight ratio of E-CF$_3$CH=CHF to the total amount of E-CF$_3$CH=CHF and CF$_3$CH$_2$F is from about 0.3 to 0.4. Also of note are compositions wherein component (b) is CF$_3$CH$_2$F and the weight ratio of E-CF$_3$CH=CHF to the total amount of E-CF$_3$CH=CHF and CF$_3$CH$_2$F is from about 0.4 to 0.5. Also of note are compositions wherein component (b) is CF$_3$CH$_2$F and the weight ratio of E-CF$_3$CH=CHF to the total amount of E-CF$_3$CH=CHF and CF$_3$CH$_2$F is from about 0.5 to 0.6. Also of note are compositions wherein component (b) is CF$_3$CH$_2$F and the weight ratio of E-CF$_3$CH=CHF to the total amount of E-CF$_3$CH=CHF and CF$_3$CH$_2$F is from about 0.6 to 0.7. Also of note are compositions wherein component (b) is CF$_3$CH$_2$F and the weight ratio of E-CF$_3$CH=CHF to the total amount of E-CF$_3$CH=CHF and CF$_3$CH$_2$F is from about 0.7 to 0.8.

Of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.1 to 0.2. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.2 to 0.3. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is at least about 1:4 (e.g., from about 9:1 to about 1:4). Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.4 to 0.5. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.5 to 0.6. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.6 to 0.7. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.7 to 0.8. Of particular note for the compositions comprising both CHF$_2$CHF$_2$ and CF$_3$CH$_2$F described above are compositions where the weight ratio of CHF$_2$CHF$_2$ to CF$_3$CH$_2$F is from about 9:1 to about 1:1.25 (for example 1.25:1 to about 1:1.25).

In one embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.68. It has been found that compositions comprising E-CF$_3$CH=CHF and CHF$_2$CHF$_2$ have moderate glide, or less than 0.1° C. temperature glide, when the weight ratio of E-CF$_3$CH=CHF to the total amount of E-CF$_3$CH=CHF and CHF$_2$CHF$_2$ is from about 0.01 to 0.68 and also when the weight ratio of E-CF$_3$CH=CHF to the total amount of E-CF$_3$CH=CHF and CHF$_2$CHF$_2$ is from about 0.85 to 0.99. These compositions have been found to have low temperature glide, or less than 0.05° C. temperature glide when the weight ratio of E-CF$_3$CH=CHF to the total amount of E-CF$_3$CH=CHF and CHF$_2$CHF$_2$ is from about 0.01 to 0.55 and also when the weight ratio of E-CF$_3$CH=CHF to the total amount of E-CF$_3$CH=CHF and CHF$_2$CHF$_2$ is from about 0.92 to 0.99. Of note are compositions with the weight ratio of E-CF$_3$CH=CHF to the total amount of E-CF$_3$CH=CHF and CHF$_2$CHF$_2$ is from 0.3 to 0.43, which have been found to have negligible temperature glide, or less than 0.01° C. temperature glide.

Of particular note, for example as replacements for HCFC-124, are compositions wherein the weight ration of E-CF$_3$CH=CHF to the total amount of E-CF$_3$CH=CHF and C$_2$H$_2$F$_4$ is from about 0.85 to 0.69.

In one embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.69. The compositions comprising E-CF$_3$CH=CHF and CHF$_2$CHF$_2$ have been found to be non-flammable when the weight ratio of E-CF$_3$CH=CHF to the total amount of E-CF$_3$CH=CHF and CHF$_2$CHF$_2$ is from about 0.01 to 0.69.

In one embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.70. The compositions comprising E-CF$_3$CH=CHF and CHF$_2$CHF$_2$ have been found to provide capacity and COP within 4% of the maximum attainable performance when the weight ratio of E-CF$_3$CH=CHF to the total amount of E-CF$_3$CH=CHF and CHF$_2$CHF$_2$ is from about 0.01 to 0.70. The compositions comprising E-CF$_3$CH=CHF and CHF$_2$CHF$_2$ have been found to provide capacity and COP within 3% of the maximum attainable performance when the weight ratio of E-CF$_3$CH=CHF to the total amount of E-CF$_3$CH=CHF and CHF$_2$CHF$_2$ is from about 0.01 to 0.65. The compositions comprising E-CF$_3$CH=CHF and CHF$_2$CHF$_2$ have been found to provide capacity and COP within 2% of the maximum attainable performance when the weight ratio of E-CF$_3$CH=CHF to the total amount of E-CF$_3$CH=CHF and CHF$_2$CHF$_2$ is from about 0.01 to 0.55. The compositions comprising E-CF$_3$CH=CHF and CHF$_2$CHF$_2$ have been found to provide capacity and COP within 1% of the maximum attainable performance when the weight ratio of E-CF$_3$CH=CHF to the total amount of E-CF$_3$CH=CHF and CHF$_2$CHF$_2$ is from about 0.01 to 0.35.

In one embodiment, component (b) is CHF$_2$CHF$_2$ and the weight ratio of E-CF$_3$CH=CHF to the total amount of E-CF$_3$CH=CHF and CHF$_2$CHF$_2$ is from about 0.09 to 0.99. The compositions comprising E-CF$_3$CH=CHF and CHF$_2$CHF$_2$ are considered to have GWP less than 1000 when the weight ratio of E-CF$_3$CH=CHF to the total amount of E-CF$_3$CH=CHF and CHF$_2$CHF$_2$ is from about 0.09 to 0.99. The compositions comprising E-F$_3$CH=CHF and CHF$_2$CHF$_2$ are considered to have GWP less than 300 when the weight ratio of E-CF$_3$CH=CHF to the total amount of E-CF$_3$CH=CHF and CHF$_2$CHF$_2$ is from about 0.73 to 0.99. The compositions comprising E-F$_3$CH=CHF and CHF$_2$CHF$_2$ are considered to have GWP less than 150 when the weight ratio of E-CF$_3$CH=CHF to the total amount of E-CF$_3$CH=CHF and CHF$_2$CHF$_2$ is from about 0.87 to 0.99.

The compositions comprising E-F$_3$CH=CHF and CF$_3$CH$_2$F are considered to have GWP less than 150 when the weight ratio of E-CF$_3$CH=CHF to the total amount of E-CF$_3$CH=CHF and CHF$_2$CHF$_2$ is from about 0.90 to 0.99.

In one embodiment, component (b) is CF$_3$CH$_2$F and the weight ratio of E-CF$_3$CH=CHF to the total amount of E-CF$_3$CH=CHF and CF$_3$CH$_2$F is from about 0.01 to 0.82 (e.g., from about 0.05 to about 0.82). Of note are compositions comprising E-CF$_3$CH=CHF and CF$_3$CH$_2$F that are non-flammable when the weight ratio of E-CF$_3$CH=CHF to the total amount of E-CF$_3$CH=CHF and CF$_3$CH$_2$F is from about 0.01 to 0.82 (e.g., from about 0.05 to about 0.82). Also of note are compositions comprising E-CF$_3$CH=CHF and CF$_3$CH$_2$F that are non-flammable when the weight ratio of E-CF$_3$CH=CHF to the total amount of E-CF$_3$CH=CHF and CF$_3$CH$_2$F is from about 0.01 to 0.81 (e.g., from about 0.05 to about 0.81). Also of note are compositions comprising E-CF$_3$CH=CHF and CF$_3$CH$_2$F that are non-flammable when the weight ratio of E-CF$_3$CH=CHF to the total amount of E-CF$_3$CH=CHF and CF$_3$CH$_2$F is from about 0.01 to 0.80 (e.g., from about 0.05 to about 0.80).

In one embodiment, the compositions disclosed herein may be used in combination with a desiccant in a refrigeration or air-conditioning equipment (including chillers), to aid in removal of moisture. Desiccants may be composed of activated alumina, silica gel, or zeolite-based molecular sieves. Representative molecular sieves include MOLSIV XH-7, XH-6, XH-9 and XH-11 (UOP LLC, Des Plaines, Ill.). Of note are molecular sieves having nominal pore size from about 3 Angstroms to about 6 Angstroms.

In one embodiment, the compositions disclosed herein may be used in combination with at least one lubricant selected from the group consisting of polyalkylene glycols, polyol esters, polyvinylethers, mineral oils, alkylbenzenes, synthetic paraffins, synthetic naphthenes, and poly(alpha) olefins.

In some embodiments, lubricants useful in combination with the compositions as disclosed herein may comprise those suitable for use with refrigeration or air-conditioning apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

In other embodiments, lubricants may also comprise those which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants are selected by considering a given compressor's requirements and the environment to which the lubricant will be exposed.

Of particular note are lubricants selected from the group consisting of POEs, PAGs, PVEs and PCs for use with the compositions comprising (a) E-CF$_3$CH=CHF and (b) at least one compound of the formula C$_2$H$_2$F$_4$.

In one embodiment, the compositions comprising as disclosed herein may further comprise an additive selected from the group consisting of compatibilizers, UV dyes, solubilizing agents, tracers, stabilizers, perfluoropolyethers (PFPE), and functionalized perfluoropolyethers, and mixtures thereof. Of note are compositions comprising from about 1 weight percent to about 10 weight percent hydrocarbon compatibilizers for mineral oil lubricant (for example, propane, cyclopropane, n-butane, isobutane, n-pentane, isopentane, and/or neopentane). Of particular note are hydrocarbon compatibilizers including cyclopropane, cyclobutane, n-butane, isobutane, isobutene and n-pentane. Also of note are compositions comprising from about 1 weight percent to about 5 weight percent of said hydrocarbon compatibilizers.

In one embodiment, the compositions may be used with about 0.01 weight percent to about 5 weight percent of a stabilizer, free radical scavenger or antioxidant. Such other additives include but are not limited to, nitromethane, hindered phenols, hydroxylamines, thiols, phosphites, or lactones. Single additives or combinations may be used.

Optionally, in another embodiment, certain refrigeration or air-conditioning system additives may be added, as desired, to the compositions as disclosed herein in order to enhance performance and system stability. These additives are known in the field of refrigeration and air-conditioning, and include, but are not limited to, anti wear agents, extreme pressure lubricants, corrosion and oxidation inhibitors, metal surface deactivators, free radical scavengers, and foam control agents. In general, these additives may be present in the inventive compositions in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-0-Ad 8478 from Akzo Chemicals, tricresyl phosphates and related compounds. Additionally, the metal dialkyl dithiophosphates (e.g., zinc dialkyl dithiophosphate (or ZDDP), Lubrizol 1375 and other members of this family of chemicals may be used in compositions of the present invention. Other antiwear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfphonates. Metal surface deactivators include areoxalyl bis(benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

In other embodiments, additional additives include stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; and dithiophosphates, commercially available from Ciba Specialty Chemicals, Basel, Switzerland, hereinafter "Ciba," under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168; a phosphate such as (Tris-(di-tert-butylphenyl), commercially available from Ciba under the trademark Irgafos® OPH; (Di-n-octyl phosphite); and isodecyl diphenyl phosphite, commercially available from Ciba under the trademark Irgafos® DDPP; anisole; 1,4-dimethoxybenzene; 1,4-diethoxybenzene; 1,3,5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethylhexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)-silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others.

In one embodiment, ionic liquid stabilizers comprise at least one ionic liquid. Ionic liquids are organic salts that are liquid or have melting points below 100° C. In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and F—. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In one embodiment, the compositions as disclosed herein may be used with a perfluoropolyether additive. A common characteristic of perfluoropolyethers is the presence of perfluoroalkyl ether moieties. Perfluoropolyether is synonymous to perfluoropolyalkylether. Other synonymous terms frequently used include "PFPE", "PFAE", "PFPE oil", "PFPE fluid", and "PFPAE". For example, a perfluoropolyether, having the formula of $CF_3-(CF_2)_2-O-[CF(CF_3)-CF_2-O]_{j'}-R'f$, is commercially available from DuPont under the trademark Krytox® In the formula, j' is 2-100, inclusive and R'f is $CF_2CF_3$, a $C_3$ to $C_6$ perfluoroalkyl group, or combinations thereof.

Other PFPEs, commercially available from Ausimont of Milan, Italy, under the trademarks Fomblin® and Galden®, and produced by perfluoroolefin photooxidation, can also be used. PFPE commercially available under the trademark Fomblin®-Y can have the formula of $CF_3O(CF_2CF(CF_3)-O-)_m(CF_2-O-)_n-R_1f$. Also suitable is $CF_3O[CF_2CF(CF_3)O]_{m'}(CF_2CF_2O)O'(CF_2O)_{n'}-R_1f$. In the formulae $R_1f$ is $CF_3$, $C_2F_5$, $C_3F_7$, or combinations of two or more thereof; (m'+n') is 8-45, inclusive; and m/n is 20-1000, inclusive; o' is 1; (m'+n'+o') is 8-45, inclusive; m'/n' is 20-1000, inclusive.

PFPE commercially available under the trademark Fomblin®-Z can have the formula of $CF_3O(CF_2CF_2-O-)_{p'}(CF_2-O)_{q'}CF_3$ where (p'+q') is 40-180 and p'/q' is 0.5-2, inclusive.

Another family of PFPE, commercially available under the trademark Demnum™ from Daikin Industries, Japan, can also be used. It can be produced by sequential oligomerization and fluorination of 2,2,3,3-tetrafluorooxetane, yielding the formula of $F-[(CF_2)_3-O]_{t'}-R_2f$ where $R_2f$ is $CF_3$, $C_2F_5$, or combinations thereof and t' is 2-200, inclusive.

Chillers

In one embodiment of the present invention is provided a chiller apparatus for cooling (e.g., for cooling air), said apparatus containing a working fluid comprising a refrigerant comprising (a) E-$CF_3CH=CHF$ and (b) at least one tetrafluoroethane of the formula $C_2H_2F_4$; provided that the weight ratio of E-$CF_3CH=CHF$ to the total amount of E-$CF_3CH=CHF$ and $C_2H_2F_4$ is from about 0.05 to about 0.99 (e.g., from about 0.05 to about 0.82).

Figure 2:
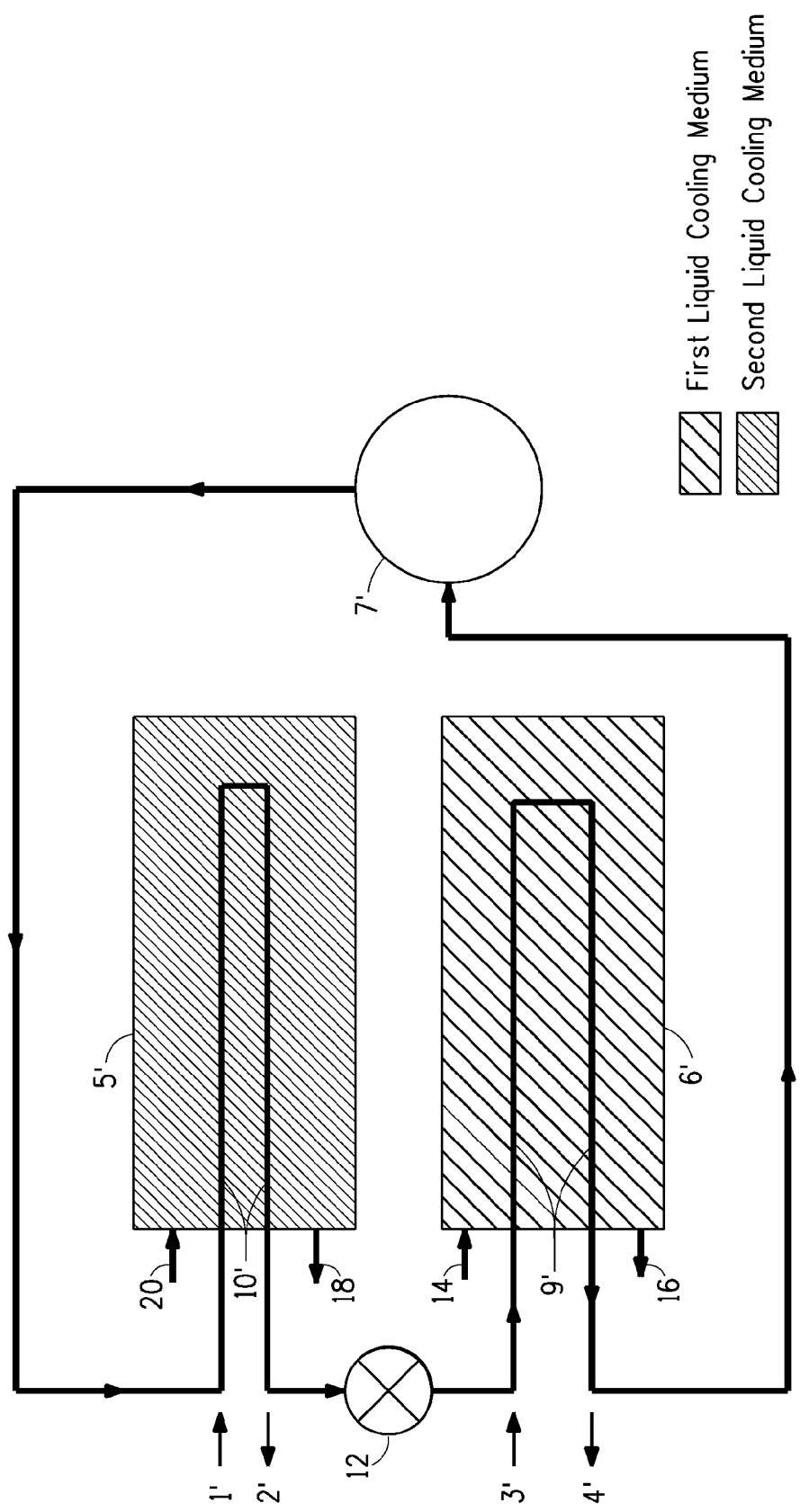
FIG. 2 is a schematic diagram of one embodiment of a direct expansion chiller apparatus which utilizes a composition containing E-CF$_3$CH=CHF and (b) at least one compound of the formula C$_2$H$_2$F$_4$.

A chiller is a type of air conditioning/refrigeration apparatus. The present disclosure is directed to a mechanical vapor compression chiller. Such vapor compression chillers may be either flooded evaporator chillers, one embodiment of which is shown in FIG. 1, or direct expansion chillers, one embodiment of which is shown in FIG. 2. Both a flooded evaporator chiller and a direct expansion chiller may be air-cooled or water-cooled. In the embodiment where chillers are water cooled, such chillers are generally associated with cooling towers for heat rejection from the system. In the embodiment where chillers are air-cooled, the chillers are equipped with refrigerant-to-air finned-tube condenser coils and fans to reject heat from the system. Air-cooled chiller systems are generally less costly than equivalent-capacity water-cooled chiller systems including cooling tower and water pump. However, water-cooled systems can be more efficient under many operating conditions due to lower condensing temperatures.

Chillers, including both flooded evaporator and direct expansion chillers, may be coupled with an air handling and distribution system to provide comfort air conditioning (cooling and dehumidifying the air) to large commercial buildings, including hotels, office buildings, hospitals, universities and the like. In another embodiment, chillers, most likely air-cooled direct expansion chillers, have found additional utility in submarines and surface vessels. Of note are chillers that provide cooling in environments with high ambient temperatures, such as in very hot climates or some industrial environments.

Chillers may use several different types of compressors, either positive displacement or dynamic compressors (e.g., centrifugal compressors). Positive displacement compressors include reciprocating, screw, or scroll compressors. Of note are chillers that use screw compressors. Also of note are chillers that use centrifugal compressors.

A centrifugal compressor uses rotating elements to accelerate the working fluid radially, and typically includes an impeller and diffuser housed in a casing. Centrifugal compressors usually take working fluid in at an impeller eye, or central inlet of a circulating impeller, and accelerate it radially outward. Some pressure rise occurs in the impeller section, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor can be practically constant over a relatively wide range of capacities. The pressure a centrifugal compressor can develop depends on the tip speed of the impeller. Tip speed is the speed of the impeller measured at its tip and is related to the diameter of the impeller and its revolutions per minute. The tip speed required in a specific application depends on the compressor work that is required to elevate the thermodynamic state of the working fluid from evaporator to condenser conditions. The volumetric flow capacity of the centrifugal compressor is determined by the size of the passages through the impeller. This makes the size of the compressor more dependent on the pressure required than the volumetric flow capacity required.

Positive displacement compressors draw vapor into a chamber, and the chamber volume is reduced to compress the vapor. After being compressed, the vapor is forced from the chamber by further decreasing the volume of the chamber to zero or nearly zero.

Reciprocating compressors use pistons driven by a crankshaft. They can be either stationary or portable, can be single- or multi-staged, and can be driven by electric motors or internal combustion engines. Small reciprocating compressors from 5 to 30 hp are seen in automotive applications and are typically for intermittent duty. Larger reciprocating compressors up to 100 hp are found in large industrial applications. Discharge pressures can range from low pressure to very high pressure (greater than 5000 psi or 35 MPa).

Screw compressors use two meshed rotating positive-displacement helical screws to force the gas into a smaller space. Screw compressors are usually for continuous operation in commercial and industrial application and may be either stationary or portable. Their application can be from 5 hp (3.7 kW) to over 500 hp (375 kW) and from low pressure to very high pressure (greater than 1200 psi or 8.3 MPa).

Scroll compressors are similar to screw compressors and include two interleaved spiral-shaped scrolls to compress the gas. The output is more pulsed than that of a rotary screw compressor.

To illustrate how chillers operate, reference is made to the Figures. A water-cooled, flooded evaporator chiller is shown illustrated in FIG. 1. In this chiller a first cooling medium, which is a warm liquid, which comprises water, and, in some embodiments, additives, such as a glycol (e.g., ethylene glycol or propylene glycol), enters the chiller from a cooling system, such as a building cooling system, shown entering at arrow 3, through a coil 9, in an evaporator 6, which has an inlet and an outlet. The warm first cooling medium is delivered to the evaporator, where it is cooled by liquid refrigerant, which is shown in the lower portion of the evaporator. The liquid refrigerant evaporates at a lower temperature than the warm first cooling medium which flows through coil 9. The cooled first cooling medium re-circulates back to the building cooling system, as shown by arrow 4, via a return portion of coil 9. The liquid refrigerant, shown in the lower portion of evaporator 6 in FIG. 1, vaporizes and is drawn into a compressor 7, which increases the pressure and temperature of the refrigerant vapor. The compressor compresses this vapor so that it may be condensed in a condenser 5 at a higher pressure and temperature than the pressure and temperature of the refrigerant vapor when it comes out of the evaporator. A second cooling medium, which is a liquid in the case of a water-cooled chiller, enters the condenser via a coil 10 in condenser 5 from a cooling tower at arrow 1 in FIG. 1. The second cooling medium is warmed in the process and returned via a return loop of coil 10 and arrow 2 to a cooling tower or to the environment. This second cooling medium cools the vapor in the condenser and causes the vapor to condense to liquid refrigerant, so that there is liquid refrigerant in the lower portion of the condenser as shown in FIG. 1. The condensed liquid refrigerant in the condenser flows back to the evaporator through an expansion device 8, which may be an orifice, capillary tube or expansion valve. Expansion device 8 reduces the pressure of the liquid refrigerant, and converts the liquid refrigerant partially to vapor, that is to say that the liquid refrigerant flashes as pressure drops between the condenser and the evaporator. Flashing cools the refrigerant, i.e., both the liquid refrigerant and the refrigerant vapor to the saturated temperature at evaporator pressure, so that both liquid refrigerant and refrigerant vapor are present in the evaporator.

It should be noted that for a single component refrigerant composition, the composition of the vapor refrigerant in the evaporator is the same as the composition of the liquid refrigerant in the evaporator. In this case, evaporation will occur at a constant temperature. However, if a refrigerant blend (or mixture) is used, as in the present invention, the liquid refrigerant and the refrigerant vapor in the evaporator (or in the condenser) may have different compositions. This may lead to inefficient systems and difficulties in servicing the equipment, thus a single component refrigerant is more desirable. An azeotrope or azeotrope-like composition will function essentially as a single component refrigerant in a chiller, such that the liquid composition and the vapor composition are essentially the same reducing any inefficiencies that might arise from the use of a non-azeotropic or non-azeotrope-like composition.

Chillers with cooling capacities above 700 kW generally employ flooded evaporators, where the refrigerant in the evaporator and the condenser surrounds an array of tubes, coil or other conduit for the cooling medium (i.e., the refrigerant is on the shell side). Flooded evaporators require higher charges of refrigerant, but permit closer approach temperatures and higher efficiencies. Chillers with capacities below 700 kW commonly employ evaporators with refrigerant flowing inside the tubes and cooling medium in the evaporator and the condenser surrounding the tubes, i.e., the cooling medium is on the shell side. Such chillers are called direct-expansion (DX) chillers. One embodiment of a water-cooled direct expansion chiller is illustrated in FIG. 2. In the chiller as illustrated in FIG. 2, first liquid cooling medium, which is a warm liquid, such as warm water, enters an evaporator 6' at inlet 14. Mostly liquid refrigerant (with a small amount of refrigerant vapor) enters a coil 9' in the evaporator at arrow 3' and evaporates, turning to vapor. As a result, first liquid cooling medium is cooled in the evaporator, and a cooled first liquid cooling medium exits the evaporator at outlet 16, and is sent to a body to be cooled, such as a building. In this embodiment of FIG. 2, it is this cooled first liquid cooling medium that cools the building or other body to be cooled. The refrigerant vapor exits the evaporator at arrow 4' and is sent to a compressor 7', where it is compressed and exits as high temperature, high pressure refrigerant vapor. This refrigerant vapor enters a condenser 5' through a condenser coil 10' at 1'. The refrigerant vapor is cooled by a second liquid cooling medium, such as water, in the condenser and becomes a liquid. The second liquid cooling medium enters the condenser through a condenser cooling medium inlet 20. The second liquid cooling medium extracts heat from the condensing refrigerant vapor, which becomes liquid refrigerant, and this warms the second liquid cooling medium in the condenser. The second liquid cooling medium exits through the condenser through the condenser cooling medium outlet 18. The condensed refrigerant liquid exits the condenser through lower coil 10' as shown in FIG. 2 and flows through an expansion device 12, which may be an orifice, capillary tube or expansion valve. Expansion device 12 reduces the pressure of the liquid refrigerant. A small amount of vapor, produced as a result of the expansion, enters the evaporator with liquid refrigerant through coil 9' and the cycle repeats.

Mechanical vapor-compression chillers may be identified by the type of compressor they employ. In one embodiment, the compositions disclosed herein are useful in a chiller which utilizes a centrifugal compressor, hereinafter referred to as a centrifugal chiller, as will be described below.

Methods

In one embodiment is provided a method for producing cooling comprising evaporating a liquid refrigerant comprising (a) E-CF$_3$CH=CHF and (b) at least one tetrafluoroethane of the formula $C_2H_2F_4$; provided that the weight ratio of E-CF$_3$CH=CHF to the total amount of E-CF$_3$CH=CHF and $C_2H_2F_4$ is from about 0.05 to 0.99 (e.g., from about 0.05 to about 0.82), in an evaporator, thereby producing a refrigerant vapor.

In one embodiment, the cooling is produced in a chiller comprising said evaporator, and the method further comprises passing a cooling medium through the evaporator, whereby said evaporation of refrigerant cools the cooling medium, and passing the cooled cooling medium from the evaporator to a body to be cooled.

A body to be cooled may be any space, object or fluid that may be cooled. In one embodiment, a body to be cooled may be a room, building, passenger compartment of an automobile, refrigerator, freezer, or supermarket or convenience store display case. Alternatively, in another embodiment, a body to be cooled may be a cooling medium or heat transfer fluid.

Of particular note is an embodiment wherein the cooling medium is water and the body to be cooled is air for space cooling.

In another embodiment, the cooling medium may be an industrial heat transfer liquid, wherein the body to be cooled is a chemical process stream, which includes process lines and process equipment such as distillation columns. Of note are industrial heat transfer liquids including ionic liquids, various brines such as aqueous calcium or sodium chloride, glycols such as propylene glycol or ethylene glycol, methanol, and other heat transfer media such as those listed in section 4 of the 2006 ASHRAE Handbook on Refrigeration.

Of note are methods, wherein the weight ratio of E-CF$_3$CH=CHF to the total amount of E-CF$_3$CH=CHF and C$_2$H$_2$F$_4$ is from about 0.5 to 0.82; particularly methods wherein the weight ratio of E-CF$_3$CH=CHF to the total amount of E-CF$_3$CH=CHF and C$_2$H$_2$F$_4$ is from about 0.6 to 0.82; and more particularly methods wherein the weight ratio of E-CF$_3$CH=CHF to the total amount of E-CF$_3$CH=CHF and C$_2$H$_2$F$_4$ is from about 0.74 to 0.82.

In some embodiments, the method to produce cooling further comprises compressing the refrigerant vapor in a centrifugal compressor.

In one embodiment of the method to produce cooling component (b) is CHF$_2$CHF$_2$ and the weight ratio of E-CF$_3$CH=CHF to the total amount of E-CF$_3$CH=CHF and CHF$_2$CHF$_2$ is less than 0.7 (e.g., from about 0.05 to 0.68).

In one embodiment of the method to produce cooling component (b) is CHF$_2$CHF$_2$ and the weight ratio of E-CF$_3$CH=CHF to the total amount of E-CF$_3$CH=CHF and CHF$_2$CHF$_2$ is from about 0.09 to 0.82.

In one embodiment of the method to produce cooling component (b) is CHF$_2$CHF$_2$ and the weight ratio of E-CF$_3$CH=CHF to the total amount of E-CF$_3$CH=CHF and CHF$_2$CHF$_2$ is from about 0.05 to 0.70.

In one embodiment of the method to produce cooling component (b) is CF$_3$CH$_2$F. Of note are methods wherein component (b) is CF$_3$CH$_2$F and the weight ratio of E-CF$_3$CH=CHF to the total amount of E-CF$_3$CH=CHF and CF$_3$CH$_2$F is less than 0.70.

In one embodiment, the method for producing cooling comprises producing cooling in a flooded evaporator chiller as described above with respect to FIG. 1. In this method, the liquid refrigerant composition is evaporated to form a refrigerant vapor in the vicinity of a first cooling medium. The cooling medium is a warm liquid, such as water, which is transported into the evaporator via a pipe from a cooling system. The warm liquid is cooled and is passed to a body to be cooled, such as a building. The refrigerant vapor is then condensed in the vicinity of a second cooling medium, which is a chilled liquid which is brought in from, for instance, a cooling tower. The second cooling medium cools the refrigerant vapor such that it is condensed to form a liquid refrigerant. In this method, a flooded evaporator chiller may also be used to cool hotels, office buildings, hospitals and universities.

In another embodiment, the method for producing cooling comprises producing cooling in a direct expansion chiller as described above with respect to FIG. 2. In this method, the liquid refrigerant composition is passed through an evaporator and evaporates to produce a refrigerant vapor. A first liquid cooling medium is cooled by the evaporating refrigerant. The first liquid cooling medium is passed out of the evaporator to a body to be cooled. In this method, the direct expansion chiller may also be used to cool hotels, office buildings, hospitals, universities, as well as naval submarines or naval surface vessels.

In either method for producing cooling in either a flooded evaporator chiller or in direct expansion chiller, the chiller includes a compressor which is a centrifugal compressor.

In another embodiment of the invention is provided a method for replacing HCFC-124 or HFC-134a refrigerant in a chiller designed for said refrigerant comprising providing a replacement refrigerant composition comprising (a) E-CF$_3$CH=CHF and (b) at least one tetrafluoroethane of the formula C$_2$H$_2$F$_4$; provided that the weight ratio of E-CF$_3$CH=CHF to the total amount of E-CF$_3$CH=CHF and C$_2$H$_2$F$_4$ is 0.05 to 0.99 (e.g., from about 0.05 to about 0.82). Of note is the method for replacing HCFC-124 or HFC-134a wherein the weight ratio of E-CF$_3$CH=CHF to the total amount of E-CF$_3$CH=CHF and C$_2$H$_2$F$_4$ component is from about 0.05 to 0.68. Also of note is the method for replacing HCFC-124 or HFC-134a wherein the weight ratio of E-CF$_3$CH=CHF to the total amount of E-CF$_3$CH=CHF and C$_2$H$_2$F$_4$ component is from about 0.09 to 0.82. Also of note is the method for replacing HCFC-124 or HFC-134a wherein the weight ratio of E-CF$_3$CH=CHF to the total amount of E-CF$_3$CH=CHF and C$_2$H$_2$F$_4$ component is from about 0.05 to 0.70. Also of note are methods for replacing HCFC-124 or HFC-134a wherein the weight ratio of E-CF$_3$CH=CHF to the total amount of E-CF$_3$CH=CHF and C$_2$H$_2$F$_4$ is from about 0.5 to 0.82; methods for replacing HCFC-124 or HFC-134a wherein the weight ratio of E-CF$_3$CH=CHF to the total amount of E-CF$_3$CH=CHF and C$_2$H$_2$F$_4$ is from about 0.6 to 0.82; and methods for replacing HCFC-124 or HFC-134a wherein the weight ratio of E-CF$_3$CH=CHF to the total amount of E-CF$_3$CH=CHF and C$_2$H$_2$F$_4$ is from about 0.74 to 0.82.

In replacing HFC-134a with the compositions as disclosed herein in existing equipment, additional advantages may be realized by making adjustments to equipment or operating conditions or both. For example, impeller diameter and impeller speed may be adjusted in a centrifugal chiller where a composition as disclosed herein is being used as a replacement working fluid.

In one embodiment, in the method for replacing HCFC-124 or HFC-134a, the chiller comprises a centrifugal compressor, having an impeller, further comprising adjusting (e.g., increasing or decreasing) the rotational speed of the impeller.

In one embodiment, in the method for replacing HCFC-124 or HFC-134a, the chiller comprises a centrifugal compressor, having an impeller, further comprising replacing the compressor impeller with a different (e.g., larger or smaller) diameter impeller.

Refrigerants and heat transfer fluids that are in need of replacement, based upon GWP calculations published by the Intergovernmental Panel on Climate Change (IPCC), include but are not limited to HCFC-124 and HFC-134a. The chiller of the present method may be a flooded evaporator chiller or a direct expansion chiller.

In this method of replacing HCFC-124 or HFC-134a, the compositions disclosed herein are useful in centrifugal chillers that may have been originally designed and manufactured to operate with HCFC-124 or HFC-134a.

In one embodiment, the method of replacing HCFC-124 or HFC-134a further comprises increasing the rotational speed of the impeller of the centrifugal compressor in order to better match the cooling capacity achieved with the HCFC-124 or HFC-134a refrigerant. In another embodiment, the method of replacing HCFC-124 or HFC-134a further comprises decreasing the rotational speed of the impeller of the centrifugal compressor in order to better match the cooling capacity achieved with the HCFC-124 or HFC-134a refrigerant.

Alternatively, in another embodiment, the method of replacing HCFC-124 or HFC-134a further comprises replacing the centrifugal compressor impeller with an impeller of larger diameter in order to better match the cooling capacity achieved with the HCFC-124 or HFC-134a refrigerant. In another embodiment, the method of replacing HCFC-124 or HFC-134a further comprises replacing the centrifugal compressor impeller with an impeller of smaller diameter in order to better match the cooling capacity achieved with the HCFC-124 or HFC-134a refrigerant.

Alternatively, in the method of replacing HCFC-124 or HFC-134a, the compositions as disclosed herein may be useful in new equipment, such as a new flooded evaporator chiller or a new direct expansion chiller. In such new equipment, a centrifugal compressor and the evaporators and condensers used therewith, may be used.

Of note as replacements are compositions wherein component (b) is $CHF_2CHF_2$ and the weight ratio of E-$CF_3CH=CHF$ to the total amount of E-$CF_3CH=CHF$ and $CHF_2CHF_2$ is from about 0.1 to 0.2. Also of note are compositions wherein component (b) is $CHF_2CHF_2$ and the weight ratio of E-$CF_3CH=CHF$ to the total amount of E-$CF_3CH=CHF$ and $CHF_2CHF_2$ is from about 0.2 to 0.3. Also of note are compositions wherein component (b) is $CHF_2CHF_2$ and the weight ratio of E-$CF_3CH=CHF$ to the total amount of E-$CF_3CH=CHF$ and $CHF_2CHF_2$ is from about 0.3 to 0.4. Also of note are compositions wherein component (b) is $CHF_2CHF_2$ and the weight ratio of E-$CF_3CH=CHF$ to the total amount of E-$CF_3CH=CHF$ and $CHF_2CHF_2$ is from about 0.4 to 0.5. Also of note are compositions wherein component (b) is $CHF_2CHF_2$ and the weight ratio of E-$CF_3CH=CHF$ to the total amount of E-$CF_3CH=CHF$ and $CHF_2CHF_2$ is from about 0.5 to 0.6. Also of note are compositions wherein component (b) is $CHF_2CHF_2$ and the weight ratio of E-$CF_3CH=CHF$ to the total amount of E-$CF_3CH=CHF$ and $CHF_2CHF_2$ is from about 0.6 to 0.7. Also of note are compositions wherein component (b) is $CHF_2CHF_2$ and the weight ratio of E-$CF_3CH=CHF$ to the total amount of E-$CF_3CH=CHF$ and $CHF_2CHF_2$ is from about 0.7 to 0.8. Of particular note are methods wherein component (b) is $CHF_2CHF_2$ and the weight ratio of E-$CF_3CH=CHF$ to the total amount of E-$CF_3CH=CHF$ and $CHF_2CHF_2$ is from about 0.05 to 0.68. Also of particular note are methods wherein component (b) is $CHF_2CHF_2$ and the weight ratio of E-$CF_3CH=CHF$ to the total amount of E-$CF_3CH=CHF$ and $CHF_2CHF_2$ is from about 0.09 to 0.82.

Of note as replacements are compositions wherein component (b) is $CF_3CH_2F$ and the weight ratio of E-$CF_3CH=CHF$ to the total amount of E-$CF_3CH=CHF$ and $CF_3CH_2F$ is from about 0.3 to 0.4. Also of note are compositions wherein component (b) is $CF_3CH_2F$ and the weight ratio of E-$CF_3CH=CHF$ to the total amount of E-$CF_3CH=CHF$ and $CF_3CH_2F$ is from about 0.4 to 0.5. Also of note are compositions wherein component (b) is $CF_3CH_2F$ and the weight ratio of E-$CF_3CH=CHF$ to the total amount of E-$CF_3CH=CHF$ and $CF_3CH_2F$ is from about 0.5 to 0.6. Also of note are compositions wherein component (b) is $CF_3CH_2F$ and the weight ratio of E-$CF_3CH=CHF$ to the total amount of E-$CF_3CH=CHF$ and $CF_3CH_2F$ is from about 0.6 to 0.7. Also of note are compositions wherein component (b) is $CF_3CH_2F$ and the weight ratio of E-$CF_3CH=CHF$ to the total amount of E-$CF_3CH=CHF$ and $CF_3CH_2F$ is from about 0.7 to 0.8. Also of note are compositions wherein component (b) is $CF_3CH_2F$ and the weight ratio of E-$CF_3CH=CHF$ to the total amount of E-$CF_3CH=CHF$ and $CF_3CH_2F$ is from about 0.76 to 0.82 (e.g., from about 0.78 to about 0.82). Of particular note, are methods wherein component (b) is $CF_3CH_2F$ and the weight ratio of E-$CF_3CH=CHF$ to the total amount of E-$CF_3CH=CHF$ and $CF_3CH_2F$ is less than 0.70. Also of particular note are methods wherein component (b) is $CF_3CH_2F$ and the weight ratio of E-$CF_3CH=CHF$ to the total amount of E-$CF_3CH=CHF$ and $CF_3CH_2F$ is from about 0.3 to 0.82.

Of note as replacements are compositions wherein component (b) is a mixture of $CHF_2CHF_2$ and $CF_3CH_2F$, wherein the weight ratio of $CHF_2CHF_2$ to $CF_3CH_2F$ is at least about 1:4 (e.g., from about 9:1 to about 1:4) and the weight ratio of E-$CF_3CH=CHF$ to the total amount of E-$CF_3CH=CHF$, $CHF_2CHF_2$ and $CF_3CH_2F$ is from about 0.1 to 0.2. Also of note are compositions wherein component (b) is a mixture of $CHF_2CHF_2$ and $CF_3CH_2F$, wherein the weight ratio of $CHF_2CHF_2$ to $CF_3CH_2F$ is at least about 1:4 (e.g., from about 9:1 to about 1:4) and the weight ratio of E-$CF_3CH=CHF$ to the total amount of E-$CF_3CH=CHF$, $CHF_2CHF_2$ and $CF_3CH_2F$ is from about 0.2 to 0.3. Also of note are compositions wherein component (b) is a mixture of $CHF_2CHF_2$ and $CF_3CH_2F$, wherein the weight ratio of $CHF_2CHF_2$ to $CF_3CH_2F$ is at least about 1:4 (e.g., from about 9:1 to about 1:4) and the weight ratio of E-$CF_3CH=CHF$ to the total amount of E-$CF_3CH=CHF$, $CHF_2CHF_2$ and $CF_3CH_2F$ is from about 0.3 to 0.4. Also of note are compositions wherein component (b) is a mixture of $CHF_2CHF_2$ and $CF_3CH_2F$, wherein the weight ratio of $CHF_2CHF_2$ to $CF_3CH_2F$ is at least about 1:4 (e.g., from about 9:1 to about 1:4) and the weight ratio of E-$CF_3CH=CHF$ to the total amount of E-$CF_3CH=CHF$, $CHF_2CHF_2$ and $CF_3CH_2F$ is from about 0.4 to 0.5. Also of note are compositions wherein component (b) is a mixture of $CHF_2CHF_2$ and $CF_3CH_2F$, wherein the weight ratio of $CHF_2CHF_2$ to $CF_3CH_2F$ is at least about 1:4 (e.g., from about 9:1 to about 1:4) and the weight ratio of E-$CF_3CH=CHF$ to the total amount of E-$CF_3CH=CHF$, $CHF_2CHF_2$ and $CF_3CH_2F$ is from about 0.5 to 0.6. Also of note are compositions wherein component (b) is a mixture of $CHF_2CHF_2$ and $CF_3CH_2F$, wherein the weight ratio of $CHF_2CHF_2$ to $CF_3CH_2F$ is at least about 1:4 (e.g., from about 9:1 to about 1:4) and the weight ratio of E-$CF_3CH=CHF$ to the total amount of E-$CF_3CH=CHF$, $CHF_2CHF_2$ and $CF_3CH_2F$ is from about 0.6 to 0.7. Also of note are compositions wherein component (b) is a mixture of $CHF_2CHF_2$ and $CF_3CH_2F$, wherein the weight ratio of $CHF_2CHF_2$ to $CF_3CH_2F$ is at least about 1:4 (e.g., from about 9:1 to about 1:4) and the weight ratio of E-$CF_3CH=CHF$ to the total amount of E-$CF_3CH=CHF$, $CHF_2CHF_2$ and $CF_3CH_2F$ is from about 0.7 to 0.8. Of particular note for the compositions comprising both $CHF_2CHF_2$ and $CF_3CH_2F$ described above are compositions where the weight ratio of $CHF_2CHF_2$ to $CF_3CH_2F$ is from about 9:1 to about 1:1.25 (for example 1.25:1 to about 1:1.25).

EXAMPLES

The concepts disclosed herein will be further described in the following examples, which do not limit the scope of the invention described in the claims.

Example 1: Replacement of HFC-134a in a Centrifugal Chiller

Prescribed Operating Conditions

| | | |
|---|---|---|
| Evaporator Temperature | ° C. | 4.44 |
| Condenser Temperature | ° C. | 37.78 |
| Liquid Subcooling | ° C. | 0.00 |
| Vapor Superheat | ° C. | 0.00 |

This example demonstrates that E-HFO-1234ze/HFC-134 blend containing 25 weight percent E-HFO-1234ze (designated as Blend "A") can replace HFC-134a in a chiller. The impeller tip speed for this blend is also close to that for HFC-134a and therefore Blend A could be used in an existing centrifugal chiller with only minor equipment modifications.

| | | HFC-134a | Blend A | Blend A vs HFC-134a % |
|---|---|---|---|---|
| Evaporator Pressure | MPa | 0.342 | 0.273 | −20.29 |
| Condenser Pressure | MPa | 0.958 | 0.778 | −18.77 |
| Compression Ratio | | 2.80 | 2.85 | 1.91 |
| Coefficient of Performance for Cooling-Isentropic | | 6.924 | 7.077 | 2.21 |
| Volumetric Capacity | kJ/m$^3$ | 2,479 | 2,070 | −16.47 |
| Impeller Tip Speed | m/s | 198.9 | 200.5 | 0.77 |

Example 2: Replacement of HFC-134a in Centrifugal Chiller

Prescribed Operating Conditions

| | | |
|---|---|---|
| Evaporator Temperature | ° C. | 4.44 |
| Condenser Temperature | ° C. | 37.78 |
| Liquid Subcooling | ° C. | 0.00 |
| Vapor Superheat | ° C. | 0.00 |

This example demonstrates that E-HFO-1234ze/HFC-134 blend containing 75 weight percent E-HFO-1234ze (designated as Blend "B") can replace HFC-134a in a chiller. The impeller tip speed for this blend is also close to that for HFC-134a and therefore Blend B could be used in an existing centrifugal chiller with only minor equipment modifications.

| | | HFC-134a | Blend B | Blend B vs HFC-134a % |
|---|---|---|---|---|
| Evaporator Pressure | MPa | 0.342 | 0.26671 | −22.05 |
| Condenser Pressure | MPa | 0.958 | 0.75491 | −21.17 |
| Compression Ratio | s | 2.80 | 2.83 | 1.13 |
| Coefficient of Performance for Cooling-Isentropic | | 6.924 | 6.998 | 1.06 |
| Volumetric Capacity | kJ/m$^3$ | 2,479 | 1,976 | −20.29 |
| Impeller Tip Speed | m/s | 199 | 193.24 | −2.87 |

Example 3: Replacement of HCFC-124 in Positive Displacement Chiller Operating at High Ambient Temp Prescribed Operating Conditions

| | | |
|---|---|---|
| Evaporator Temperature | ° C. | 4.44 |
| Condenser Temperature | ° C. | 70.00 |
| Compressor efficiency | | 0.70 |
| Liquid Subcooling | ° C. | 0.00 |
| Vapor Superheat | ° C. | 0.00 |

This example demonstrates that E-HFO-1234ze/HFC-134 blend containing 50 weight percent E-HFO-1234ze (designated as Blend "C") can replace HFC-124 in a chiller.

| | | HCFC-124 | Blend C | Blend C vs HCFC-124 |
|---|---|---|---|---|
| Evaporator Pressure | MPa | 0.19 | 0.27 | 42.14 |
| Condenser Pressure | MPa | 1.26 | 1.73 | 36.94 |
| Compression Ratio | | 6.57 | 6.33 | −3.66 |
| Coefficient of Performance for Cooling-Isentropic | | 2.68 | 2.66 | −0.79 |
| Volumetric Capacity | kJ/m$^3$ | 982.08 | 1,365.11 | 39.00 |

Example 4: Flammability Testing of Compositions Containing E-CF$_3$CH=CHF and CHF$_2$CHF$_2$ A composition containing 70 weight percent E-CF$_3$CH=CHF (E-HFO-1234ze) and 30 weight percent CHF$_2$CHF$_2$ (HFC-134) was tested according to the ASTM E681-2001 test procedure at a temperature of 60° C. and was found to be flammable. A composition containing 69.9 weight percent E-CF$_3$CH=CHF (E-HFC-1234ze) and 30.1 weight percent CHF$_2$CHF$_2$ (HFC-134) was tested under the same conditions and was found to be non-flammable.

Example 5: Flammability Testing of Compositions Containing E-CF$_3$CH=CHF and CF$_3$CH$_2$F A composition containing 82.5 weight percent E-CF$_3$CH=CHF (E-HFO-1234ze) and 17.5 weight percent CF$_3$CH$_2$F (HFC-134a) was tested according to the ASTM E681-2001 test procedure at a temperature of 60° C. and was found to be flammable. A composition containing 81.3 weight percent E-CF$_3$CH=CHF) and 18.7 weight percent CF$_3$CH$_2$F was tested under the same conditions and was found to be flammable with a single value for UFL and LFL. A composition containing 80 weight percent E-CF$_3$CH=CHF) and 20 weight percent CF$_3$CH$_2$F was tested under the same conditions and was found to be non-flammable. A composition containing 81.25 weight percent E-CF$_3$CH=CHF) and 18.75 weight percent CF$_3$CH$_2$F was tested under the same conditions and was found to be non-flammable.

Example 6: Replacement of HFC-134a in a Centrifugal Chiller

Prescribed Operating Conditions

| | | |
|---|---|---|
| Evaporator Temperature | ° C. | 4.44 |
| Condenser Temperature | ° C. | 37.78 |
| Liquid Subcooling | ° C. | 0.00 |
| Vapor Superheat | ° C. | 0.00 |

This example demonstrates that E-HFO-1234ze/HFC-134a blend containing 80 weight percent E-HFO-1234ze (designated as Blend "D") can replace HFC-134a in a chiller. Additionally, the GWP for Blend D is only 291 compared to HFC-134a GWP equal to 1430, providing a significant improvement.

| | | HFC-134a | Blend D | Blend D vs HFC-134a % |
|---|---|---|---|---|
| Evaporator Pressure | MPa | 0.342 | 0.28 | −19.2 |
| Condenser Pressure | MPa | 0.958 | 0.78 | −18.6 |
| Compression Ratio | | 2.80 | 2.82 | +0.8 |
| Coefficient of Performance for Cooling-Isentropic | | 6.924 | 6.947 | +0.3 |
| Volumetric Capacity | kJ/m$^3$ | 2,479.00 | 2,025.02 | −18.3 |
| Impeller Tip Speed | m/s | 198.90 | 192.08 | −3.4 |

What is claimed is:

1. A method for producing cooling comprising evaporating a liquid refrigerant consisting of (a) E-CF3CH═CHF and (b) CHF2CHF2; provided that the weight ratio of E-CF3CH═CHF to the total amount of E-CF3CH═CHF and CHF2CHF2 is from about 0.05 to 0.68, in an evaporator, thereby producing a refrigerant vapor; wherein the cooling is produced in a chiller comprising said evaporator; and wherein said chiller further comprises a centrifugal compressor.

2. The method of claim 1 further comprising passing a cooling medium through the evaporator, whereby said evaporation of refrigerant cools the cooling medium, and passing the cooled cooling medium from the evaporator to a body to be cooled.

3. The method of claim 2, wherein the cooling medium is water and the body to be cooled is air for space cooling or the cooling medium is an industrial heat transfer liquid and the body to be cooled is a chemical process stream.

4. The method of claim 2, further comprising compressing the refrigerant vapor in the centrifugal compressor.

5. The method of claim 1, wherein the weight ratio of E-CF3CH═CHF to the total amount of E-CF3CH═CHF and CHF2CHF2 is from about 0.6 to less than 0.68.

6. A method for replacing HCFC-124 or HFC-134a refrigerant in a chiller designed for said HCFC-124 or HFC-134a refrigerant comprising providing a replacement refrigerant composition consisting of (a) E-CF3CH═CHF and (b) CHF2CHF2;
provided that the weight ratio of E-CF3CH═CHF to the total amount of E-CF3CH═CHF and CHF2CHF2 is from about 0.05 to 0.68; wherein said chiller comprises a centrifugal compressor.

7. The method of claim 6, wherein the centrifugal compressor, has an impeller, further comprising adjusting the rotational speed of the impeller.

8. The method of claim 6, wherein the centrifugal compressor, has an impeller, further comprising replacing the compressor impeller with a different diameter impeller.

9. The method of claim 6, wherein the weight ratio of E-CF3CH═CHF to the total amount of E-CF3CH═CHF and CHF2CHF2 is from about 0.6 to less than 0.68.

10. A chiller apparatus for cooling, said apparatus containing a working fluid comprising a refrigerant consisting of (a) E-CF3CH═CHF and (b) CHF2CHF2; provided that the weight ratio of E-CF3CH═CHF to the total amount of E-CF3CH═CHF and CHF2CHF2 is from about 0.05 to 0.68; wherein said chiller comprises a centrifugal compressor.

11. The chiller apparatus of claim 10, wherein the weight ratio of E-CF3CH═CHF to the total amount of E-CF3CH═CHF and CHF2CHF2 is from about 0.6 to less than 0.68.

* * * * *